United States Patent [19]
Lomax et al.

[11] 3,799,688
[45] Mar. 26, 1974

[54] APPARATUS FOR TRIMMING PLUMBING PIPES BELOW FLOOR LEVEL

[76] Inventors: Harold R. Lomax, 901 Cardinal Pl., Thomasville, N.C. 27360; Bobby K. Potts, R.F.D. 2, High Point, N.C. 27260

[22] Filed: Mar. 22, 1971

[21] Appl. No.: 236,901

[52] U.S. Cl. ............................... 408/196, 408/80
[51] Int. Cl. .................................... B23b 27/02
[58] Field of Search ........... 408/196, 80, 81, 82, 83, 408/79, 227, 231, 233, 147, 186, 201, 209, 225; 82/4 C; 90/12, 12.5

[56] References Cited
UNITED STATES PATENTS
2,401,979  6/1946  Smith.............................. 408/196
897,041  8/1908  Weller............................... 408/82
438,230  10/1890  Erd................................... 408/196

*Primary Examiner*—Gil Weidenfeld

[57] ABSTRACT

A plumbing pipe is initially rough cut to extend above the proposed floor level which is subsequently finished. A weighted cylindrical pilot member carries at least one cutting tool extending radially beyond the cylindrical wall a distance equal to or slightly greater than the wall thickness of the pipe. The pilot member includes a shank received by a hand drill or the like and is inserted into the opening in the pipe. The hand drill is then activated with the cutting tool in engagement with the pipe until the pipe is cut to a desired point below the finished floor level.

2 Claims, 4 Drawing Figures

PATENTED MAR 26 1974 3,799,688

APPARATUS FOR TRIMMING PLUMBING PIPES BELOW FLOOR LEVEL

BACKGROUND OF THE INVENTION

During the initial plumbing phases of building construction, the pipe connecting water closets to the sewer line is conventionally run up through the sub-flooring and cut off at a point 1 or 2 inches above the proposed finished floor level. After the finished flooring has been completed, the pipe is then cut down to a desired point below the floor level.

Previously, when terra cotta or cast iron pipes were in use there was no problem with this method, because the pipes at that time were cut off level with the finished floor and the water closet attached thereto as described in U.S. Pat. No. 1,476,983. However, with the advent of tile flooring and plastic (ABS) type, design changes have been made to previous construction methods whereby the ABS pipe must be cut to a point below the floor level, whereupon an adapter is fitted onto the top thereof to which the water closet is then mounted.

There is no known tool for accomplishing the cutting of the pipe below the floor level, and at the present time plumbers generally use a chisel or some type of gouge to manually cut the pipe to the desired level. This leaves a ragged upper edge and cannot be accomplished with very close dimensions.

The present invention, on the other hand, is directed to an apparatus adapted for use with a hand drill or other rotary power tool, and which when used properly can accurately cut the pipe down to any desired level below the floor and achieve an even upper edge onto which the adapter may be better fitted. The apparatus includes a weighted pilot member having an upper surface and a cylindrical side wall, the diameter of which approximately equals the inside diameter of the pipe to be cut to prevent vibration of the tool during operation. Preferably two opposed cutting tools are received in radial grooves approximately 180° apart in the upper surface of the pilot member. The cutting tools extend outwardly beyond the side wall of the pilot a distance at least equal to the thickness of the pipe to be cut. In operation the shank is inserted into a hand drill or other similar means and the pilot member is inserted into the upper end of the pipe. The apparatus is then activated and cuts the pipe down to and beyond the floor level a prescribed distance, cutting away all of the pipe desired without harming the finished flooring and leaving an even surface on the top of the pipe.

In an alternate embodiment, when the apparatus is desired to be used with larger diameter pipes, a sleeve is attached around the pilot member, and the cutting tools moved outwardly within the slots so that they extend beyond the sleeve a distance approximately equal to the wall thickness of the pipe, the sleeve becoming the pilot member.

It is therefore an object of the present invention to provide an apparatus for cutting off plumbing pipes to a point beneath floor level after the floor has been finished, thereby making it possible to cut the pipe accurately and smoothly.

It is a further object of the present invention to provide an apparatus of the type described which can be adapted for use with varying sizes of pipe.

Further objects and advantages of the present invention will be readily apparent from the following description taken in conjunction with the accompanying drawings, wherein.

Figure 1:
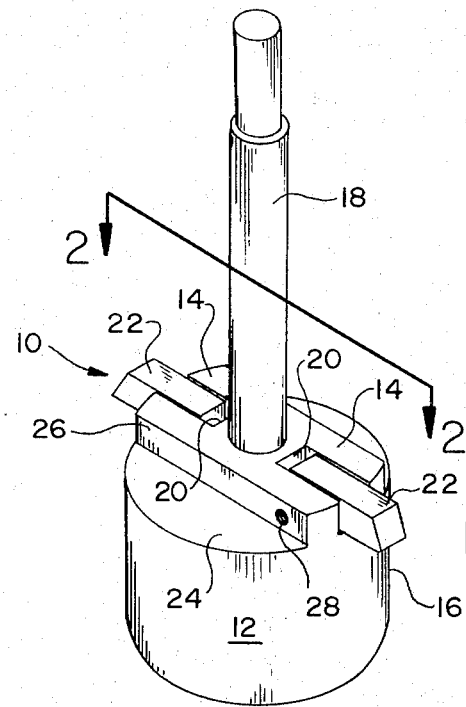
FIG. 1 is a perspective view illustrating the apparatus according to the present invention.
Figure 2:
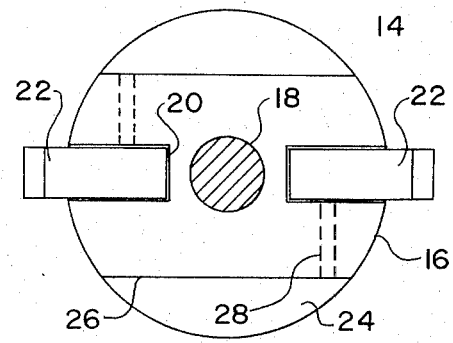
FIG. 2 is a plan view taken substantially along lines 2—2 in FIG. 1.
Figure 3:
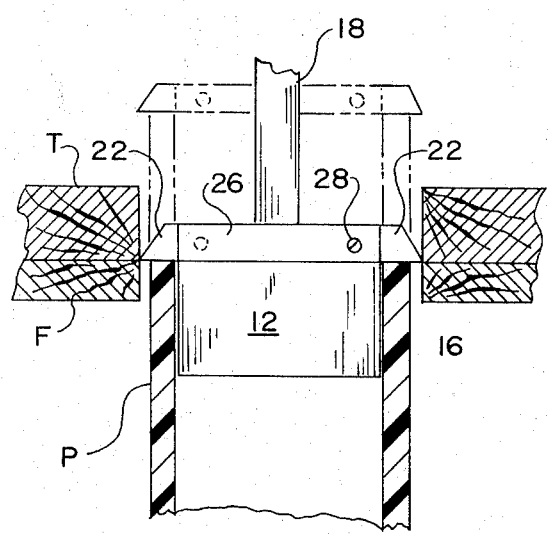
FIG. 3 is a side elevation of the apparatus showing the adjacent floor and pipe in section to more clearly demonstrate the operation according to the present invention.

Turning now to the drawings, there is illustrated in FIGS. 1–3 a first embodiment of the present invention. As the construction is commenced, the ABS pipe P is connected into the sewer system, and extends into the area which is to become the floor of the bathroom. The pipe is initially rough cut to a point an inch or two above the finished floor level, as illustrated in the dotted line position in FIG. 3. The sub-flooring F and final tile flooring T are then finished surrounding pipe P. It is at this time that the apparatus of the present invention is used to trim the pipe P down to the level shown in the solid line position of FIG. 3 below the level of the tile flooring T.

The apparatus 10 includes a pilot member 12 having an upper surface 14 and a cylindrical side wall 16. The outer diameter of said side wall is approximately equal to the inside diameter of the plumbing pipe P, whereby the pilot member 12 when inserted into the pipe engages the walls of the pipe and prevents vibration of the cutting tool during operation. It should be recognized that pilot member 12 may be either a solid cylindrical member or it may be hollow, as long as the outer diameter approximates the inner pipe diameter and the pilot member is sufficiently heavy to prevent vibration during operation of the apparatus. A shank 18 extends upwardly from upper surface 14 and provides a means for attachment to a hand drill or other power source.

The pilot member includes a holding means in the form of a pair of radial slots or grooves 20 spaced approximately 180° apart in the upper surface 14 of pilot member 12 which slidably receive cutting tools 22 therein. Shoulders 24, generally parallel to slots 20 in the upper surface 14 provide an upstanding wall 26 through which a set screw may be inserted to adjustably secure the cutting tools 22 at desired positions within slots 20. It should be noted here that the apparatus might contain only one groove 20 with one cutting tool 22, however it has been found preferable to use two tools spaced apart approximately 180°.

Cutting tools 22 are so adjusted within slot 20 that they extend outwardly from the side wall a distance approximately equal to the thickness of pipe 10 or slightly greater, whereupon as the pipe is cut to the described level, little if any of the flooring is cut away. If some of the floor is cut away, it is not detrimental to the construction, because the adapter which mounts atop the end of pipe P has a flange which covers the floor surrounding the opening.

Figure 4:
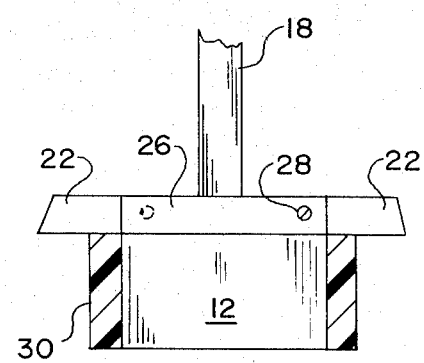
FIG. 4 is a side elevation of an alternate embodiment of the invention illustrating the sleeve in sections.

An alternate embodiment of the invention is illustrated in FIG. 4 wherein cases where the pipe P is of larger diameter than normal, a cylindrical sleeve 30 having an outer diameter approximately equal to the inner diameter of the larger pipe and an inner diameter approximately equal to the outer diameter of cylindrical wall 16 is slid onto the cylindrical side wall 16 of pilot member 12. Set screws 28 are then loosened, cutting tools slid outwardly and again fixed within slots 20, so that the tool extends beyond the outer wall of sleeve 30 a distance approximately equal to the wall thickness of the larger pipe. The operation then proceeds the same as in the embodiment described above.

While preferred embodiments of the present invention have been described in detail, it is to be understood that the invention is not limited thereto and reference therefor is made to the claims for summaries of the essentials of the invention and of the novel combination of parts.

What is claimed is :

1. A rotary cutting implement adapted to be powered by a hand drill motor for trimming plumbing pipes of a type initially rough cut to a point above a proposed floor level to a prescribed point below the level of the floor after finishing comprising:
    a. a shank having a first end adapted for insertion in the chuck of said hand drill motor;
    b. a pilot member attached to the end of said shank opposite said first end, said pilot member having an outer diameter approximately equal to the inner diameter of said plumbing pipe, whereby said pilot member is insertable longitudinally into the pipe, said pilot member being sufficiently heavy to prevent vibration of the cutting means during the cutting operation;
    c. a cutting tool and a holding means fixedly retaining said cutting tool to said pilot member in a position extending outwardly from said pilot member;
    d. said cutting tool having an effective cutting edge extending radially beyond said pilot member a distance approximately equal to the thickness of the plumbing pipe to be trimmed but less than the diameter of the opening in said finished floor, whereby said trimming may be accomplished without disturbing the finished floor surrounding the plumbing pipe.
    e. said pilot member including a cylindrical side wall and an upper surface having a generally radial groove therein extending through said side wall and receiving said cutting tool therein, a retaining means for fixedly holding said tool in said groove;
    f. a second cutting tool received in a second radial groove spaced approximately 180° from said first radial groove; and
    g. said pilot member including an upstanding wall spaced from and adjacent each radial groove, a threaded opening in each shoulder communicating with said groove, and a set screw positioned in each opening to tighten said tool in said groove.

2. A rotary cutting implement adapted to be powered by a hand drill motor for trimming plumbing pipes of a type initially rough cut to a point above a proposed floor level to a prescribed point below the level of the floor after the floor is finished, said implement comprising:
    a. a shank having a first end adapted for insertion in the chuck of said hand drill motor;
    b. a pilot member attached to the end of said shank opposite said first end, said pilot member comprising a cylindrical side wall having an outer diameter approximately equal to the inner diameter of said plumbing pipe, whereby said pilot member is insertable longitudinally into the pipe, said pilot member being sufficiently heavy to prevent vibration of the cutting implement during the cutting operation;
    c. said pilot member further including an upper surface having an upstanding wall extending diametrically thereacross and upwardly therefrom, said upstanding wall including at least one generally radial groove therein extending through the cylindrical side wall, portions of said wall on either side of said groove forming a pair of shoulders, a threaded opening in one of said shoulders communicating with said groove;
    d. a cutting tool positioned in said radial groove and extending outwardly from said pilot member, said cutting tool having an effective exposed cutting edge extending radially beyond said pilot member a distance approximately equal to the thickness of the plumbing pipe to be trimmed but less than the diameter of the opening in said finished floor, whereby said trimming may be accomplished without disturbing the finished floor surrounding the plumbing pipe; and
    e. a set screw positioned in said opening and movable to a position to fixedly retain said tool in said groove.

* * * * *